United States Patent
Cheng et al.

(10) Patent No.: US 9,407,644 B1
(45) Date of Patent: Aug. 2, 2016

(54) SYSTEMS AND METHODS FOR DETECTING MALICIOUS USE OF DIGITAL CERTIFICATES

(71) Applicant: Symantec Corporation, Mountain View, CA (US)

(72) Inventors: Tao Cheng, Chengdu (CN); Kevin Roundy, El Segundo, CA (US); Jie Fu, Chengdu (CN); Zhi Kai Li, Zigong (CN); Ying Li, Jinzhou (CN)

(73) Assignee: Symantec Corporation, Mountain View, CA (US)

( * ) Notice: Subject to any disclaimer, the term of this patent is extended or adjusted under 35 U.S.C. 154(b) by 138 days.

(21) Appl. No.: 14/089,999

(22) Filed: Nov. 26, 2013

(51) Int. Cl.
*H04L 29/06* (2006.01)
*G06F 15/18* (2006.01)

(52) U.S. Cl.
CPC ........ *H04L 63/1408* (2013.01); *H04L 63/1441* (2013.01)

(58) Field of Classification Search
CPC ............ H04L 63/0823; H04L 63/1408; H04L 63/1441; H04L 63/126; H04L 63/166; H04L 63/02; G06F 21/00; G06F 21/30; G06F 21/33
USPC ....................... 726/22–25; 713/168, 175, 156
See application file for complete search history.

(56) References Cited

U.S. PATENT DOCUMENTS

| | | | |
|---|---|---|---|
| 7,634,811 B1 * | 12/2009 | Kienzle et al. .................. 726/22 |
| 7,739,494 B1 * | 6/2010 | McCorkendale et al. ..... 713/156 |
| 8,161,547 B1 * | 4/2012 | Jennings et al. ................ 726/22 |
| 8,181,251 B2 | 5/2012 | Kennedy | |
| 8,429,734 B2 | 4/2013 | Agbabian et al. | |
| 8,776,238 B2 * | 7/2014 | Pomerantz ...................... 726/25 |
| 9,075,989 B2 * | 7/2015 | Satish ..................... G06F 21/55 |
| 2005/0081037 A1 * | 4/2005 | Kumagai et al. .............. 713/175 |
| 2005/0278787 A1 * | 12/2005 | Naslund .................. G06F 21/10 726/26 |
| 2006/0070126 A1 * | 3/2006 | Grynberg ............ G06F 21/6263 726/22 |
| 2007/0220259 A1 * | 9/2007 | Pavlicic ................. G06Q 20/02 713/176 |
| 2008/0148401 A1 * | 6/2008 | Shen ............................... 726/22 |
| 2009/0077383 A1 * | 3/2009 | de Monseignat ... H04L 63/0823 713/175 |
| 2010/0162395 A1 * | 6/2010 | Kennedy ............... G06F 21/563 726/23 |

(Continued)

OTHER PUBLICATIONS

Asadoorian, Paul, "Uncovering SSL Anomalies in Your Network Using SecurityCenter", http://www.tenable.com/blog/uncovering-ssl-anomalies-in-your-network-using-securitycenter, as accessed Sep. 25, 2013, Tenable Network Security, (Oct. 23, 2012).
Evans, Chris et al., "Public Key Pinning Extension for HTTP draft-evans-palmer-key-pinning-00", http://tools.ietf.org/html/draft-evans-palmer-key-pinning-00, as accessed Sep. 25, 2013, IETF Trust, (Nov. 14, 2011).

(Continued)

*Primary Examiner* — Shanto M Abedin
(74) *Attorney, Agent, or Firm* — ALG Intellectual Property, LLC

(57) ABSTRACT

A computer-implemented method for detecting malicious use of digital certificates may include determining that a digital certificate is invalid. The method may further include locating, within the invalid digital certificate, at least one field that was previously identified as being useful in distinguishing malicious use of invalid certificates from benign use of invalid certificates. The method may also include determining, based on analysis of information from the field of the invalid digital certificate, that the invalid digital certificate is potentially being used to facilitate malicious communications. The method may additionally include performing a security action in response to determining that the invalid digital certificate is potentially being used to facilitate malicious communications. Various other methods, systems, and computer-readable media are disclosed.

17 Claims, 7 Drawing Sheets

(56) References Cited

U.S. PATENT DOCUMENTS

| | | | |
|---|---|---|---|
| 2010/0186086 A1* | 7/2010 | Guzner et al. | 726/22 |
| 2011/0239288 A1* | 9/2011 | Cross et al. | 726/11 |
| 2012/0216253 A1* | 8/2012 | Cahn | G06F 21/33 726/3 |
| 2013/0007114 A1* | 1/2013 | Wee | G06F 9/505 709/203 |
| 2013/0081129 A1* | 3/2013 | Niemela | H04L 63/0236 726/11 |
| 2014/0095866 A1* | 4/2014 | Grebennikov | H04L 9/3268 713/156 |
| 2014/0283054 A1* | 9/2014 | Janjua et al. | 726/23 |

OTHER PUBLICATIONS

Constantin, Lucian, "Researchers propose TLS extension to detect rogue SSL certificates", http://www.computerworld.com/s/article/9227481/Researchers_propose_TLS_extension_to_detect_rogue_SSL_certificates, as accessed Sep. 25, 2013, Computerworld Inc., (May 24, 2012).

"Damballa", https://www.damballa.com/, as accessed Sep. 25, 2013, (Jun. 3, 2003).

"Nessus", http://www.tenable.com/products/nessus-vulnerability-scanner, as accessed Sep. 25, 2013, Tenable Network Security, (On or before Sep. 25, 2013).

* cited by examiner

| Malware Certificate 502 | |
|---|---|
| Field | Value |
| Issuer | voxsc.lzjndk.dqcdpshzig.gov,... |
| Valid from | Monday, July 5, 2011 |
| Valid to | Tuesday, July 6, 2012 |
| Subject | br.o.8p8wt.z9kenxch.y8xijx... |
| Public Key | RSA (768 bits) |

*FIG. 5A*

| Legitimate Certificate 504 | |
|---|---|
| Field | Value |
| Issuer | VeriSign Class 3 International Ser... |
| Valid from | Friday, November 1, 2013 |
| Valid to | Monday, November 2, 2014 |
| Subject | business-gurus.consultants.com |
| Public Key | RSA (1024 bits) |
| Subject Alternative Name | DNS Name = business-gurus.con... |
| Certificate Policies | [1]Certificate Policy:Policy Identif... |

*FIG. 5B*

SYSTEMS AND METHODS FOR DETECTING MALICIOUS USE OF DIGITAL CERTIFICATES

BACKGROUND

Software security developers (e.g., anti-malware developers) may use intrusion prevention signatures and intrusion detection signatures to detect and/or prevent malware attacks against computing systems. However, malware may hide attacks within encrypted HTTPS sessions to avoid detection. Anti-malware applications may be unable to monitor these sessions for malicious content as they are often encrypted using Secure Socket Layer (SSL) certificates. Anti-malware programs may, however, attempt to detect whether an SSL certificate used to establish a malicious HTTPS session is a suspicious certificate (e.g., a stolen or revoked certificate). However, not all suspicious certificates are used for malicious purposes. For example, some organizations may, for legitimate purposes, use seemingly suspicious self-signed or expired digital certificates.

What is needed, therefore, is a more efficient and effective mechanism for detecting malicious use of digital certificates.

SUMMARY

As will be described in greater detail below, the instant disclosure generally relates to systems and methods for detecting malicious use of digital certificates. For example, a method for detecting malicious use of digital certificates may include determining that a digital certificate is invalid. In some examples, determining that the digital certificate is invalid may include determining that the digital certificate is self-signed. The method may further include locating, within the invalid digital certificate, at least one field that was previously identified as being useful in distinguishing malicious use of invalid certificates from benign use of invalid certificates. The method may also include determining, based on an analysis of information from the field of the invalid digital certificate, that the invalid digital certificate is potentially being used to facilitate malicious communications. Additionally, the method may include performing a security action in response to determining that the invalid digital certificate is potentially being used to facilitate malicious communications.

In one embodiment, the computer-implemented method may further include identifying the field as being useful for distinguishing malicious use of invalid certificates from benign use of invalid certificates by examining one or more fields of a set of invalid digital certificates that have been used maliciously and examining one or more fields of a set of invalid digital certificates that have been used legitimately. The computer-implemented method may then deduce, based on the examination of the fields of the sets of invalid digital certificates that have been used maliciously and legitimately, that the field is useful for distinguishing malicious use of invalid certificates from benign use of invalid certificates.

In at least one embodiment, determining that the invalid digital certificate is potentially being used to facilitate malicious communications may include determining that the invalid digital certificate is being used to establish an encrypted communication session for a malicious purpose. In one example, performing the security action may include interrupting the encrypted communication session.

In various examples, analyzing the information within the field of the invalid digital certificate may include identifying a domain name within the field. In these examples, the computer-implemented method may further include pinging the domain name to determine if it is a legitimate domain name and/or identifying a reputation score for the domain name.

In some embodiments, determining that the invalid digital certificate is potentially being used to facilitate malicious communications may include detecting that the information within the field includes one or more of a domain name comprising a randomly generated character string, a certificate chain length of 0, and/or a public key length that does not conform to a key-length standard.

In one embodiment, a system for implementing the above-described method may include a determination module, stored in memory, that determines that a digital certificate is invalid. In one example, the determination module may determine that the digital certificate is invalid by determining that the digital certificate is self-signed. The system may also include a location module, stored in memory, that locates, within the invalid digital certificate, at least one field that was previously identified as being useful in distinguishing malicious use of invalid certificates from benign use of invalid certificates. The system may further include an analysis module, stored in memory, that determines, based on an analysis of information from the field of the invalid digital certificate, that the invalid digital certificate is potentially being used to facilitate malicious communications. Additionally, the method may include a security module, stored in memory, that performs a security action in response to determining that the invalid digital certificate is potentially being used to facilitate malicious communications. The system may include at least one processor configured to execute the determination module, the location module, the analysis module, and the security module.

In some examples, the system may further include a deduction module, stored in memory, that identifies the field as being useful for distinguishing malicious use of invalid certificates from benign use of invalid certificates. The system may distinguish malicious and benign use of invalid certificates by examining one or more fields of a set of invalid digital certificates that have been used maliciously, examining one or more fields of a set of invalid digital certificates that have been used legitimately, and deducing, based on the examination of the fields of the sets of invalid digital certificates, that a particular field is useful for distinguishing malicious use of invalid certificates from benign use of invalid certificates.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to determine that a digital certificate is invalid. The one or more computer-executable instructions may further cause the computing device to locate, within the digital certificate, at least one field that was previously identified as being useful in distinguishing malicious use of invalid certificates from benign use of invalid certificates. The one or more computer-executable instructions may also determine, based on analysis of information from the field of the invalid digital certificate, that the invalid digital certificate is potentially being used to facilitate malicious communications. Additionally, the one or more computer-executable instructions may perform a security action in response to determining that the invalid digital certificate is potentially being used to facilitate malicious communications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5A is a block diagram of an exemplary malware certificate.

FIG. 5B is a block diagram of an exemplary legitimate certificate.

Figure 1:
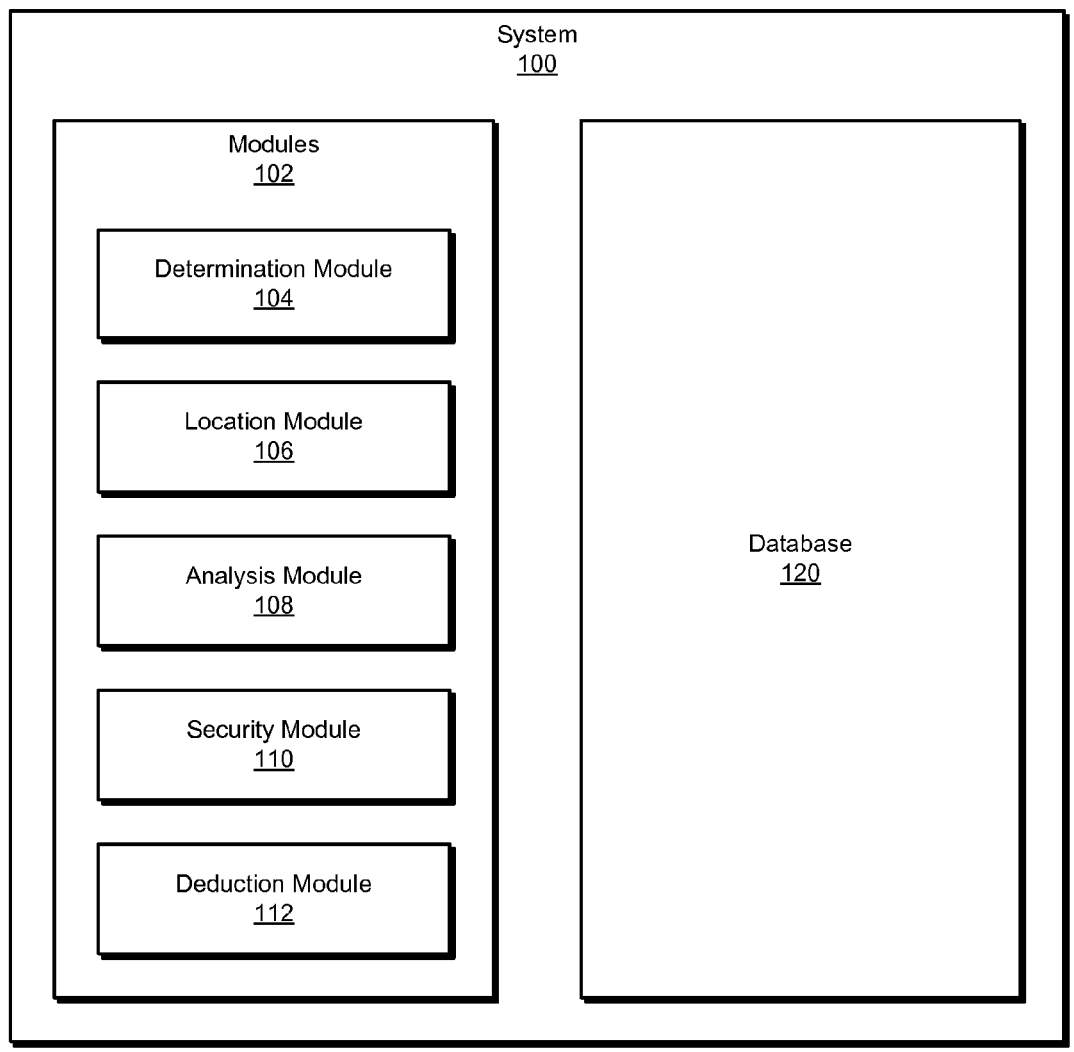
FIG. 1 is a block diagram of an exemplary system for detecting malicious use of digital certificates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting malicious use of digital certificates. As will be explained in greater detail below, the systems and methods disclosed herein may identify fields and information within invalid digital certificates that are indicative of the invalid certificates being used maliciously. For example, embodiments of the instant disclosure may train a machine learning algorithm on sets of benign and malicious invalid digital certificates to identify fields and information within the certificates that can be used to distinguish the benign certificates from the malicious certificates. After identifying fields and information indicative of malicious use of digital certificates, the systems and methods disclosed herein may detect malicious use of suspicious digital certificates by analyzing information within fields of the certificates to determine if the information is indicative of the certificates being used for malicious purposes. By determining if a suspicious certificate is being used maliciously, anti-malware developers may detect potential attacks hidden within HTTPS communications while still allowing legitimate organizations to use self-signed or expired certificates.

The following will provide, with reference to FIGS. 1-2, 4A-4B, and 5A-5B, detailed descriptions of exemplary systems for detecting malicious use of digital certificates. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting malicious use of digital certificates. As illustrated in this figure, exemplary system 100 may include one or more modules 102 for performing one or more tasks. For example, and as will be explained in greater detail below, exemplary system 100 may include a determination module 104 that may determine that a digital certificate is invalid. Exemplary system 100 may also include a location module 106 that may locate, within the invalid digital certificate, at least one field that was previously identified as being useful in distinguishing malicious use of invalid certificates from benign use of invalid certificates. System 100 may additionally include an analysis module 108 that may determine, based on an analysis of information from the field of the invalid digital certificate, that the invalid digital certificate is potentially being used to facilitate malicious communications. System 100 may further include a security module 110 that may perform a security action in response to determining that the invalid digital certificate is potentially being used to facilitate malicious communications.

In some embodiments, exemplary system 100 may also include a deduction module 112 that identifies (e.g., as part of a machine-learning algorithm) a field within an invalid digital certificate as being useful for distinguishing malicious use of invalid certificates from benign use of invalid certificates.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), client computing device 408 in FIG. 4A, client computing device 420 in FIG. 4B, computing system 610 in FIG. 6, and/or portions of exemplary network architecture 700 in FIG. 7. One or more of modules 102 in FIG. 1 may also represent all or portions of one or more special-purpose computers configured to perform one or more tasks. Although illustrated as separate elements, one or more of modules 102 in FIG. 1 may represent portions of a single module or application.

As illustrated in FIG. 1, exemplary system 100 may also include one or more databases, such as database 120. In one example, database 120 may be configured to store data about digital certificate fields that have been identified as being useful for distinguishing malicious use of invalid certificates from benign use of invalid certificates. For example, deduction module 112 may, after identifying a field as being useful for distinguishing malicious use of invalid certificates from benign use of invalid certificates, store information about that field in database 120. One or more of the modules within computing device 202 in FIG. 2 may retrieve this information via network 204 for use in detecting malicious use of digital certificates.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
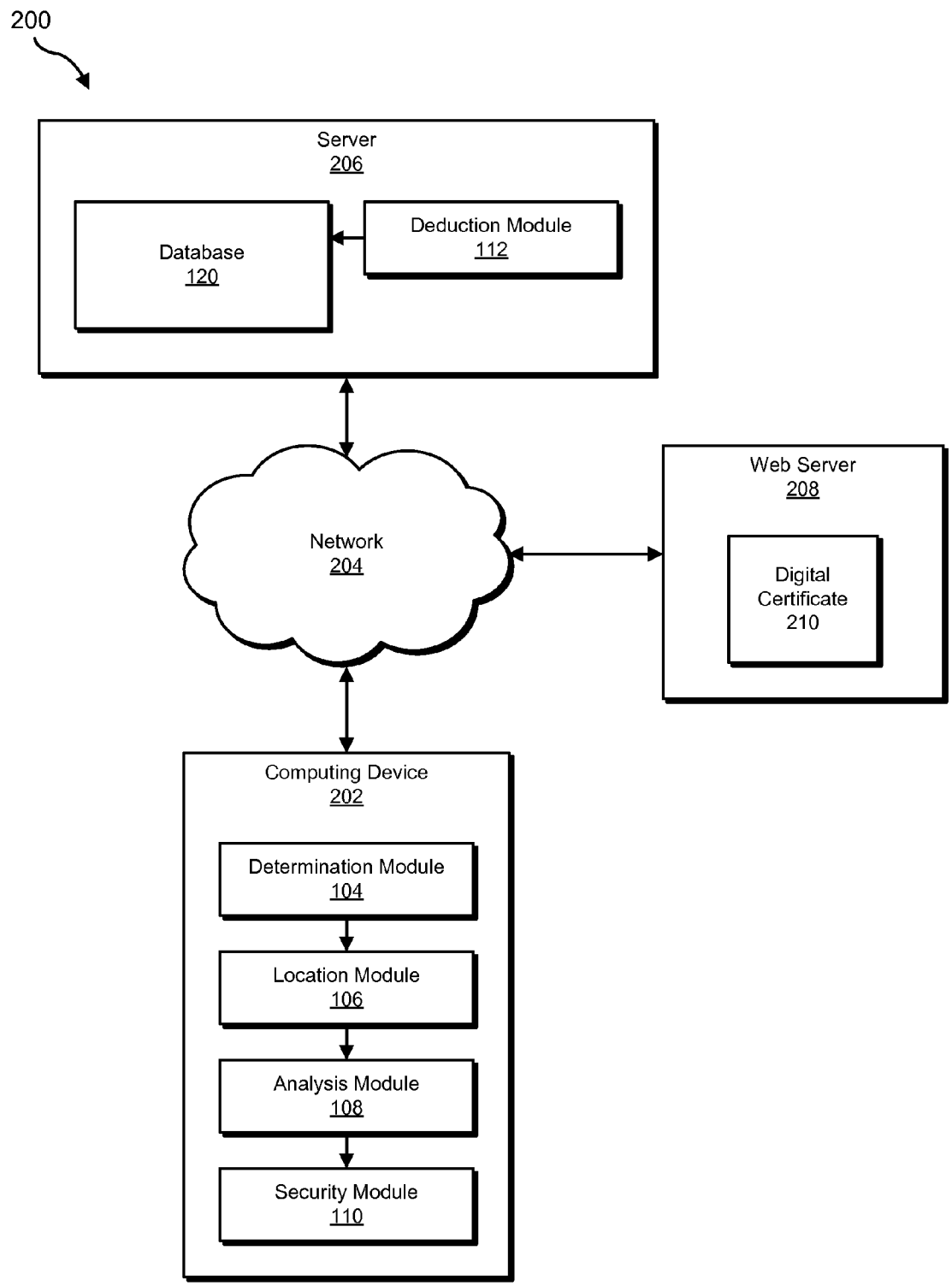
FIG. 2 is a block diagram of the exemplary system shown in FIG. 1 implemented on computing devices that are communicating via a network.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., an end user's device) in communication with a server 206 (e.g., a server of a security software vendor) via a network 204. System 200 may also include a web server 208 that contains a digital certificate 210. Web server 208 may establish secure connections with computing device 202 via network 204 using digital certificate 210. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect malicious use of digital certificates. For example, and as will be described in greater detail below, determination module 104 may be programmed to determine (when e.g., attempting to communicate securely with web server 208) that digital certificate 210 is invalid. Location module 106 may be programmed to locate, within digital certificate 210, at least one field that was previously identified as being useful in distinguishing malicious use of invalid certificates from benign use of invalid certificates. In some examples, deduction module 112 may have previously identified the field as being useful in distinguishing malicious use of invalid certificates from benign use of invalid certificates and then stored that information in database 120. In these examples, location module 106 may retrieve this information from database 120 and use it to locate the field that was previously identified (by deduction module 112) as being useful in distinguishing malicious use of invalid certificates from benign use of invalid certificates.

In addition, analysis module 108 may determine, based on an analysis of information from the field of digital certificate 210, that digital certificate 210 is potentially being used to facilitate malicious communications with computing device 202. Security module 110 may, in response to determining that digital certificate 210 is potentially being used to facilitate malicious communications with computing device 202, attempt to protect computing device 202 by performing a security action.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary client computing device 408 in FIG. 4A, exemplary client computing device 420 in FIG. 4B, exemplary computing system 610 in FIG. 6, or any other suitable computing device.

Server 206 generally represents any type or form of computing device that is capable of identifying fields within invalid digital certificates that may be useful in distinguishing malicious certificates from benign certificates. In some examples, server 206 may be configured to provide, via network 204, information about these fields to other computing devices, such as computing device 202, client computing device 408 in FIG. 4A, or client computing device 420 in FIG. 4B. Examples of server 206 include, without limitation, application servers and database servers configured to provide various database services and/or run certain software applications.

Web server 208 generally represents any type or form of computing device that is capable of establishing encrypted communications with at least one other computing device. In some embodiments, web server 208 may be configured to establish, via network 204, encrypted communications with computing device 202. For example, web server 208 may communicate with computing device 202 via an HTTPS session that was established using digital certificate 210.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206. In some examples, network 204 may facilitate encrypted communications between computing device 202 and web server 208.

Figure 3:
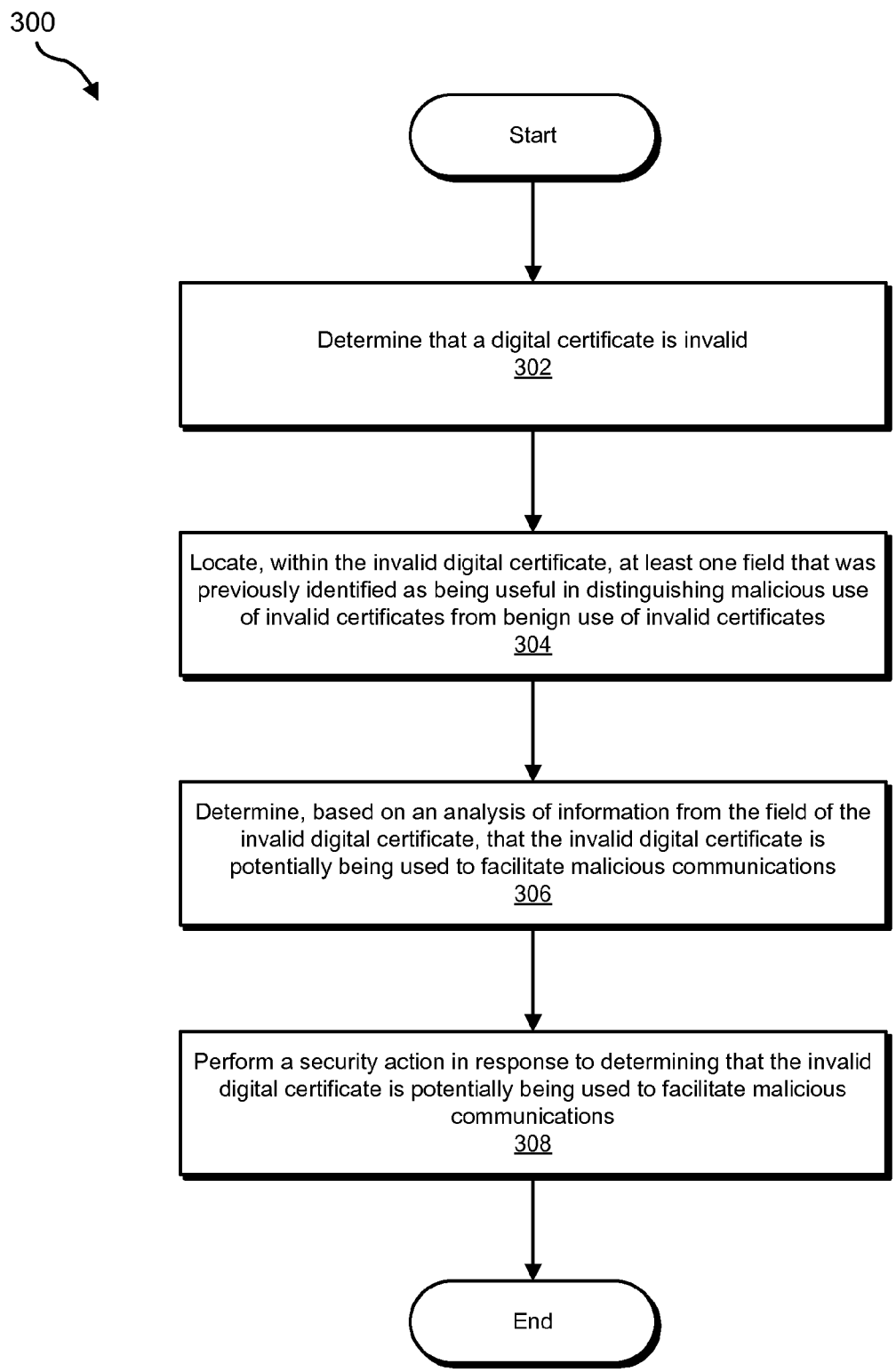
FIG. 3 is a flow diagram of an exemplary method for detecting malicious use of digital certificates.

FIG. 3 is a flow diagram of an exemplary computer-implemented method 300 for detecting malicious use of digital certificates. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, client computing device 408 in FIG. 4A, client computing device 420 in FIG. 4B, computing system 610 in FIG. 6, and/or portions of exemplary network architecture 700 in FIG. 7.

As illustrated in FIG. 3, at step 302 one or more of the systems described herein may determine that a digital certificate is invalid. For example, at step 302 determination module 104 may, as part of computing device 202 in FIG. 2, determine that digital certificate 210 is invalid.

As used herein, the phrase "digital certificate" generally refers to any type or form of electronic document used to verify the identity of an entity. In some examples, digital certificates may verify the identity of an entity with a digital signature (from, e.g., a certificate authority) to bind the public half of an asymmetric key pair associated with an entity with information that uniquely identifies the entity. Examples of digital certificates include, without limitation, web server certificates, such as Transport Layer Security (TSL) certificates, Secure Socket Layer (SSL) certificates, Extended Validation SSL (EV SSL) certificates, etc. When used by a web server, digital certificates may enable secure connections between a web server and a browser (e.g., may enable communications via the Hypertext Transfer Protocol Secure (HTTPS) protocol).

The term "invalid," as used herein with reference to digital certificates (e.g. "invalid digital certificate"), generally refers to any digital certificate that may be considered suspicious, unsafe, unusable, unstable, and/or unreliable in any way. For example, an "invalid digital certificate" may be any digital certificate that has been revoked and is therefore considered generally unreliable. Examples of invalid digital certificates may include, without limitation, certificates that are revoked, expired, stolen, forged, faked, self-signed, falsified, and/or generally untrusted. In some embodiments, invalid digital certificates may be digital certificates that are identified as invalid by anti-malware applications. For example, an anti-malware service located on a computing device (e.g., computing device 202) may include anti-malware tools capable of detecting whether a digital certificate used to establish an HTTPS session is revoked, expired, stolen, self-signed, etc. In at least one embodiment, an invalid digital certificate may be a certificate that is no longer trusted by a Certificate Authority (CA). In some embodiments, an invalid digital certificate may be a malware certificate that was self-signed for a malicious purpose. For example, a malware program may use a self-signed digital certificate to hide malicious attacks (against, e.g., computing device 202) within an HTTPS session.

Determination module 104 may determine that a digital certificate is invalid in a variety of ways. For example, determination module 104 may be any part of any application on computing device 202 that is capable of detecting whether a digital certificate being used in communications with computing device 202 is invalid. In some embodiments, determination module 104 may, when computing device 202 attempts to communicate securely with web server 208, determine that digital certificate 210 is invalid. In some examples, web server 208 may communicate with computing device 202 via HTTPS, and determination module 104 may determine that the digital certificate (e.g., digital certificate 210) used to establish the HTTPS communication is invalid. In one embodiment, determination module 104 may be part of an anti-malware service located on computing device 202 capable of detecting whether a digital certificate used to establish HTTPS communications with computing device 202 is invalid.

At step 304, one or more of the systems described herein may locate, within the invalid digital certificate, at least one field that was previously identified as being useful in distinguishing malicious use of invalid certificates from benign use of invalid certificates. For example, at step 304 location module 106 may, as part of computing device 202, locate, within digital certificate 210, at least one field that was previously identified (e.g., using a machine-learning algorithm) as being useful in distinguishing malicious use of invalid certificates from benign use of invalid certificates.

As used herein, the term "field," when used in reference to digital certificates, generally refers to any part or portion of a digital certificate that contains any type of information. In some examples, the term "field" may refer to any part of a digital certificate that contains information specific to the digital certificate. For example, a field may contain information about a digital certificate, such as the version, serial number, signature algorithm, signature hash algorithm, issuer, subject, public key, validity dates (e.g., "valid from" and/or "valid to" fields), enhanced key usage, subject alternative name, authority information access, subject key identified, certificate policies, CRL distribution points, basic constraints, thumbprint algorithm, thumbprint, certification path, certificate chain length, domain name of the of the issuer, domain name of the entity the certificate is issued to, extensions, and/or any other information about a digital certificate. In one embodiment, the term "field" may refer to any information about a digital certificate that can be presented in a Graphical User Interface (GUI), such as "fields" and "values" tabs.

As used herein, the phrase "malicious use of invalid certificates" generally refers to any use an invalid digital certificate that may be generally considered malicious, harmful, unsafe, and/or undesirable. For example, malware programs may use invalid digital certificates maliciously to sign and/or authenticate malicious programs, to hide malicious attacks (such as viruses, trojans, etc.) within an encrypted communication session that was established using an invalid certificate, and/or to harm and/or attack a computing device in any way that involves the use of an invalid certificate.

As used herein, the phrase "benign use of invalid certificates" generally refers to any use of invalid certificates that may be considered legitimate and/or safe. For example, "benign use of invalid certificates" may refer to invalid digital certificates that are used to protect legitimate communications and/or sign legitimate software. In some examples, the phrase "benign use of invalid certificates" may refer to using an invalid (e.g., self-signed) digital certificate to establish a legitimate, non-malicious communication with a computing device.

Location module 106 may locate a field that was previously identified as being useful in distinguishing malicious use of invalid certificates from benign use of invalid certificates in a variety of ways. For example, a field within an invalid digital certificate may have been previously identified by another module, such as deduction module 112, or by an individual, such as an administrator.

In some examples, location module 106 may be part of an anti-malware service designed to retrieve information stored in database 120. For example, deduction module 112 may be part of the same anti-malware service as location module 106 and may be located on a security software vendor's system (e.g., server 206).

In some examples, deduction module 112 may store information about the identified field or fields within database 120. In these examples, location module 106 may locate the field based on updates received from database 120 and/or by querying database 120.

Deduction module 112 may examine a variety of fields within a digital certificate in order to deduce that a field is useful for distinguishing malicious use of invalid certificates from benign use of invalid certificates. For example, deduction module 112 may examine the types of fields depicted in FIGS. 5A and 5B.

Deduction module 112 may examine the fields of invalid certificates (e.g., the fields in malware certificate 502 and legitimate certificate 504) in a variety of ways. For example, deduction module 112 may be part of a machine learning algorithm that is capable of being trained to distinguish malicious use of invalid certificates from benign use of invalid certificates. Deduction module may implement any suitable type or form of machine learning algorithm. For example, deduction module 112 may implement an algorithm that determines that a particular field is more useful than others in distinguishing malicious and benign use of certificates. Similarly, deduction module 112 may implement an algorithm that determines that particular types of information within the fields of invalid certificates are more useful than others.

As another example, deduction module 112 may implement a machine-learning algorithm that compares the fields of malware certificates with the fields of legitimate certificates (e.g., malware certificate 502 and legitimate certificate 504) and weight the fields according to their effectiveness in distinguishing malicious and benign use of certificates. For example, deduction module 112 may examine the "subject" fields of malware certificate 502 and legitimate certificate 504 and deduce that malware certificates sometimes include erroneous information within "subject" fields while, on the other hand, legitimate certificates generally include legitimate information within "subject" fields. Deduction module 112 may then deduce that "subject" fields are more useful than other types of fields in distinguishing malicious use of invalid certificates from benign use of invalid certificates. In some embodiments, deduction module 112 may deduce that fields that are left blank (i.e., contain no information or "null" information) are useful for distinguishing malicious use of invalid certificates from benign use of invalid certificates. For example, some fields shown in legitimate certificate 504 are not present in malware certificate 502, indicating that certain fields within malware certificate 502 were left blank or contain a "null" value. According to various embodiments, deduction module 112 may weight blank or "null" optional fields as being more important than other fields for distinguishing malicious and benign use of certificates.

In some examples, deduction module 112 may implement an algorithm that identifies and analyzes different types of information within the fields of invalid certificates to assess how effectively such information can be used to distinguish malicious and benign use of certificates. For example, deduction module 112 may determine that fields within a malware certificate sometimes contain a randomly generated character string (e.g., the values shown in the "issuer" and "subject" fields of malware certificate 502) and deduce, based on this determination, that random character strings are more useful than other types of information for distinguishing malicious and benign use of certificates.

Deduction module 112 may use any other suitable process and/or machine learning algorithm to examine fields within invalid certificates. Examples of machine learning algorithms that may be used to distinguish malicious and benign use of certificates may include, without limitation, case-based reasoning algorithms, decision tree algorithms, inductive logic programming algorithms, genetic algorithms, reinforcement learning algorithms, instance-based learning algorithms, and/or any other suitable type of machine learning algorithm.

Deduction module 112 may evaluate tens, hundreds, thousands, or even millions of digital certificates to identify fields that are useful for distinguishing malicious and benign use of invalid certificates.

At step 306 one or more of the systems herein may determine, based on an analysis of information from the field of the invalid digital certificate, that the invalid digital certificate is potentially being used to facilitate malicious communications. For example, at step 306 analysis module 108 may, as part of computing device 202, determine, based on an analysis of information from the field of digital certificate 210, that digital certificate 210 is potentially being used to facilitate malicious communications between web server 208 and computing device 202 via network 204.

As described herein, a digital certificate may "facilitate" a malicious communication if it relates to, pertains to, or is involved with the malicious communication in any way. For example, a digital certificate that is used in any way to set up, establish, encrypt, prolong, protect, enable, assist, expedite, and/or aid a malicious communication may be facilitating the malicious communication. In some examples, a digital certificate that is used during the handshake step of a malicious HTTPS session may be facilitating a malicious communication.

Analysis module 108 may determine that digital certificate 210 is potentially being used to facilitate malicious communications in a variety of ways. In some examples, analysis module 108 may, after analyzing information from the field of digital certificate 210, determine that digital certificate 210 is being used to establish an encrypted communication session for a malicious purpose (e.g., malicious communication 412 in FIG. 4A). In one embodiment, analysis module 108 may search for specific types of information within the field of digital certificate 210. Examples of the types of information that analysis module 108 may search for may include, without limitation, a domain name that includes a randomly generated character string, a certificate chain length of 0 (i.e., no chain of trust to a CA or other entity), a public key length that does not conform to a key-length standard, and or any other information that may be useful in determining whether an invalid digital certificate is potentially being used to facilitate malicious communications.

Analysis module 108 may analyze any type of information from any type of field within digital certificate 210. For example, analysis module 108 may analyze types of information similar to those shown in the "value" fields of malware certificate 502 and legitimate certificate 504. In one example, analysis module 108 may determine that malware certificate 502 is potentially being used to facilitate malicious communications after detecting a random string of characters in the "subject" field. In another example, analysis module 108 may determine that malware certificate 502 is potentially being used to facilitate malicious communications because malware certificate 502 is using an outdated RSA bit length of 768 bits.

In some embodiments, analysis module 108 may identify a domain name within the field of malware certificate 502 and then ping that domain name to determine if it is a legitimate domain name. For example, analysis module 108 may ping the domain name listed in the "subject" field of malware certificate 502 and discover that it is not a legitimate domain name. In some embodiments, analysis module 108 may identify a reputation score for the domain name.

At step 308 one or more of the systems herein may perform a security action in response to determining that the invalid digital certificate is potentially being used to facilitate malicious communications. For example, at step 308 security module 110 may, as part of computing device 202, perform a security action for computing device 202 in response to determining that digital certificate 210 is potentially being used by web server 208 to facilitate malicious communications with computing device 202.

As used herein, the phrase "security action" generally refers to any type or form of action taken by any application, program, code, device, entity, etc. that attempts to protect a computing device from malicious and/or harmful activities. For example, a "security action" may be any action that attempts to prevent and/or block malicious activities on a computing device, such as computing device 202. In some examples, the phrase "security action" may refer to any attempt to block and/or interrupt malicious communications between two computing devices, such as a malicious HTTPS session between a web server and a client computing device.

Figure 4A:
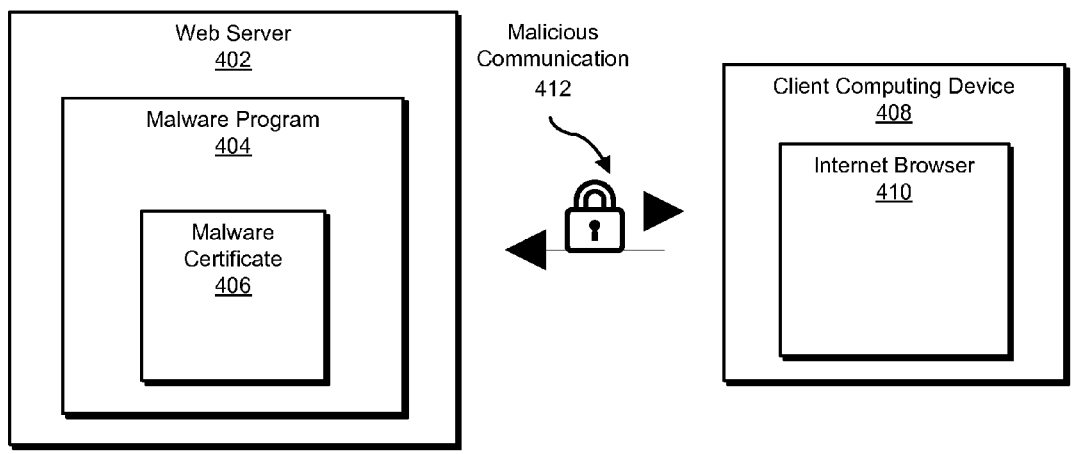
FIG. 4A is a block diagram of an exemplary malicious communication between two computing devices.
Figure 4B:
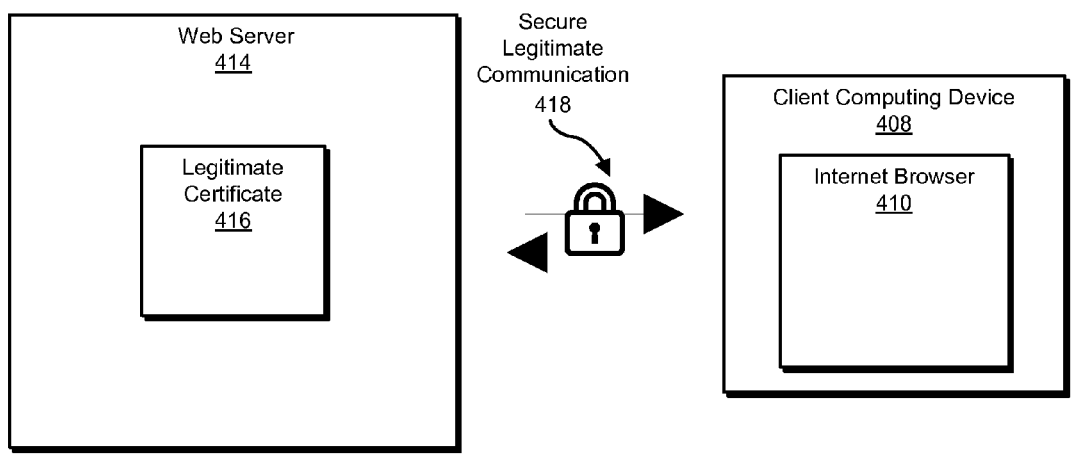
FIG. 4B is a block diagram of an exemplary legitimate communication between two computing devices.

In some embodiments, one or more of modules 102 may be part of an anti-malware service and may perform the steps described above during and/or at the start of an encrypted communication session. FIGS. 4A and 4B have been included within the instant disclosure to illustrate examples of malicious and benign communication sessions. FIG. 4A is a block diagram of an exemplary malicious communication between web server 402 and client computing device 408. Web server 402 may host a malware program 404, and malware program 404 may contain a malware certificate 406. Client computing device 408 may include an internet browser 410 and an anti-malware service 413 that is programmed with one or more modules 102. Malware program 404 may use malware certificate 406 to facilitate a malicious communication 412 with internet browser 410.

FIG. 4B is a block diagram of an exemplary legitimate communication between web server 414 and client computing device 420. Web server 414 may use a legitimate certificate 416 to facilitate legitimate communications with other computing devices, such as legitimate communication 418. Additionally, client computing device 420 may include an internet browser 422 and an anti-malware service 423 that is programmed with one or more modules 102. Web server 414 may use legitimate certificate 416 to facilitate a legitimate communication 418 with internet browser 422.

In some embodiments, internet browser 410 may attempt to communicate securely with web server 402 via HTTPS, and malware program 404 may use malware certificate 406 to facilitate and/or establish malicious communication 412. Anti-malware service 413 may be programmed to monitor incoming communications sent to client computing device 408. In some embodiments, anti-malware service 413 may, as part of monitoring malicious communication 412, determine that malware certificate 406 is self-signed and therefore invalid. Anti-malware service 413 may then locate a field in malware certificate 406 that was previously identified as being useful in distinguishing malicious use of invalid certificates from benign use of invalid certificates, and determine, based on an analysis of information from the field, that malware certificate 406 is being used to facilitate malicious communication 412. Anti-malware service 413 may, in response to determining that malware certificate 406 is being used to facilitate malicious communication 412, perform one or more of a variety of security actions. For example, anti-malware service 413 may interrupt and/or block malicious communication 412. In some examples, anti-malware service 413 may add malware certificate 406 to one or more lists of known malware certificates. In some embodiments, anti-malware service 413 may add malware certificate 406 and/or information about malware certificate 406 to a database that is used by a software module (e.g., deduction module 112) to identify fields useful for distinguishing malicious use of invalid certificates from benign use of invalid certificates.

In some examples, if a digital certificate is being used to facilitate a benign and/or legitimate communication, security module 110 may perform the security action by allowing the communication to continue. For example, anti-malware service 423 may determine that legitimate certificate 416 is self-signed and therefore invalid. After analyzing one or more fields within legitimate certificate 416, anti-malware service 423 may determine that legitimate certificate 416 is a benign certificate and is being used to facilitate legitimate communication 418. Anti-malware service 423 may then, based on determining that legitimate certificate 416 is being used to facilitate a benign communication, allow legitimate communication 418 to continue without interruption.

As explained above, malware attacks may be increasingly difficult to detect as they may be hidden within encrypted communication sessions. For example, malware developers may use self-signed or otherwise suspicious SSL certificates to establish HTTPS sessions that anti-malware applications may be unable to monitor. Similarly suspicious SSL certificates, however, may be used by legitimate organizations for legitimate communications. While anti-malware applications may be unable to monitor the contents of encrypted communications, they may be able to examine the digital certificates used to establish those communications. However, traditional solutions may be unable to distinguish between invalid certificates that are being used maliciously and invalid certificates that are being used for legitimate reasons. The instant disclosure may overcome these problems and/or other problems by analyzing information within the fields of invalid digital certificates to distinguish between benign and malicious certificates. In addition, by distinguishing between malicious and benign use of certificates, the systems and methods presented herein may provide robust and nuanced security services that block and/or prevent malicious use of invalid certificates while allowing legitimate use of invalid certificates.

Figure 6:
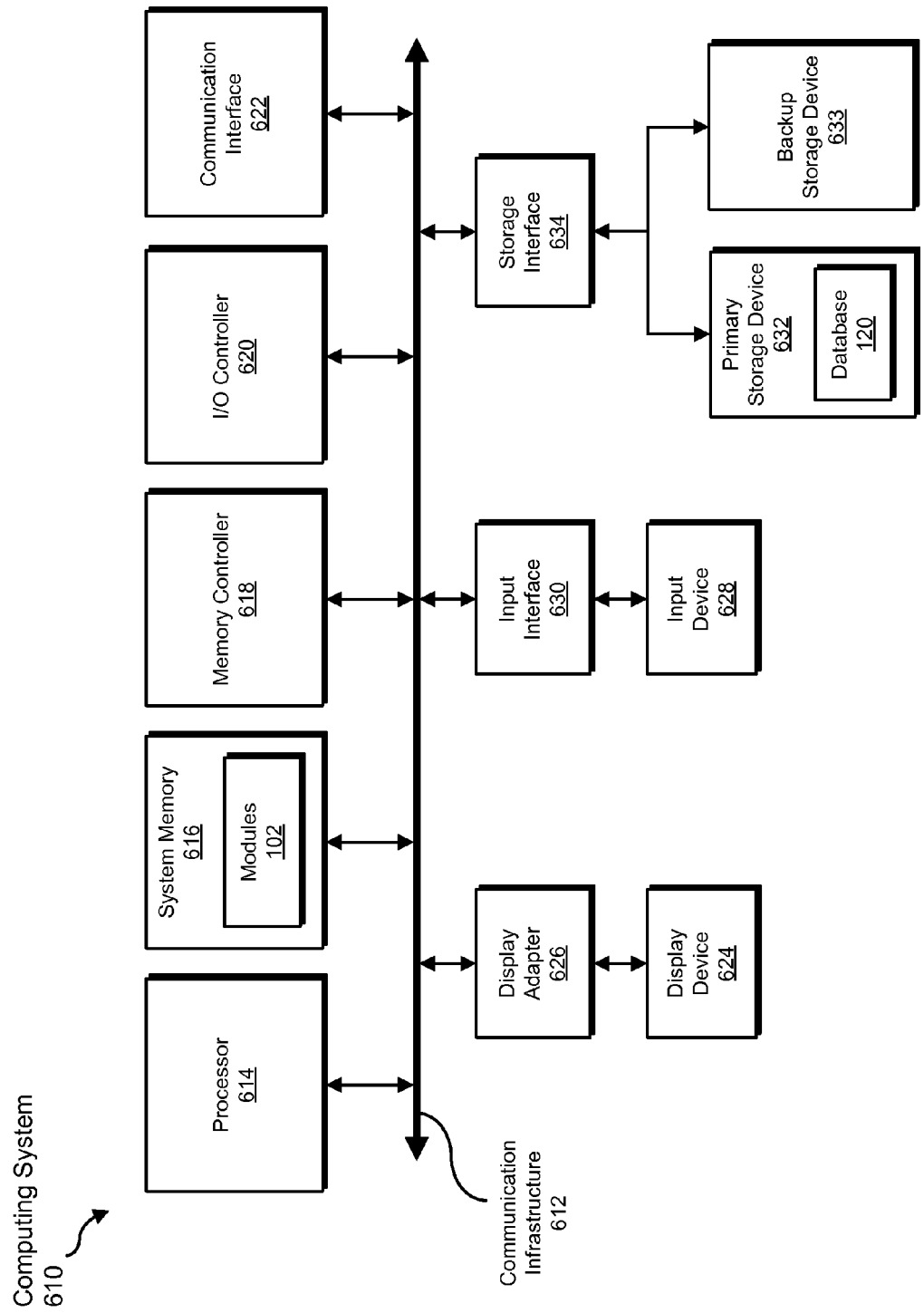
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
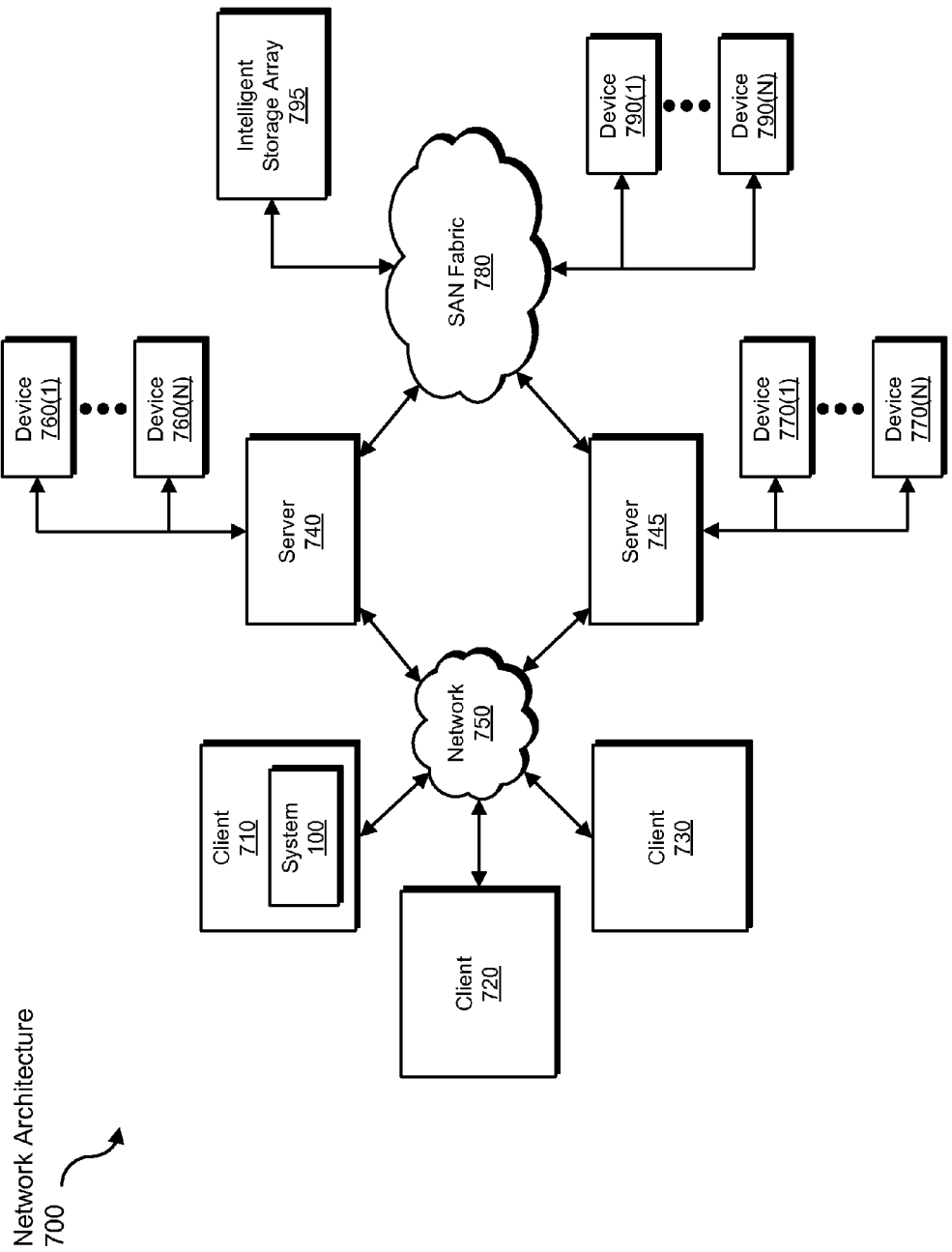
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malicious use of digital certificates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about a certificate field to be transformed, transform the data about the certificate field into identification data, and use the result of the transformation to identify and/or detect malicious use of digital certificates. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malicious use of digital certificates, at least a portion of the method being performed by a computing device comprising at least one processor, the method comprising:

deducing, by a deduction module, an effectiveness of a plurality of fields within digital certificates in distinguishing malicious use of invalid certificates from benign use of invalid certificates by using a machine learning algorithm to examine fields of invalid certificates that have been used maliciously and fields of invalid certificates that have been used legitimately;

weighting, by the deduction module, each of the plurality of fields according to the effectiveness of the fields;

identifying, by the deduction module and based on the weighting of each of the plurality of fields, at least one field within invalid digital certificates that is more useful than at least one other field in distinguishing malicious use of invalid certificates from benign use of invalid certificates;

before performing an analysis to determine whether a digital certificate is potentially being used to facilitate malicious communications, determining, by a determination module, that the digital certificate is invalid by determining that the digital certificate is not trusted by a certificate authority;

in response to determining that the digital certificate is invalid, locating, by a location module, within the invalid digital certificate, the field that was identified as being more useful in distinguishing malicious use of invalid certificates from benign use of invalid certificates;

determining, by an analysis module, based on an analysis of information from the field of the invalid digital certificate, that the invalid digital certificate is potentially being used to facilitate malicious communications;

performing, by a security module, a security action in response to determining that the invalid digital certificate is potentially being used to facilitate malicious communications.

2. The computer-implemented method of claim 1, wherein determining that the digital certificate is not trusted by the certificate authority comprises determining that the digital certificate is self-signed.

3. The computer-implemented method of claim 1, wherein determining that the invalid digital certificate is potentially being used to facilitate malicious communications comprises determining that the invalid digital certificate is being used to establish an encrypted communication session for a malicious purpose.

4. The computer-implemented method of claim 3, wherein performing the security action comprises interrupting the encrypted communication session.

5. The computer-implemented method of claim 1, wherein determining that the invalid digital certificate is potentially being used to facilitate malicious communications comprises detecting that the information within the field comprises at least one of:
- a domain name that comprises a randomly generated character string;
- a certificate chain length of 0;
- a public key length that does not conform to a key-length standard.

6. The computer-implemented method of claim 1, wherein:
analyzing the information within the field of the invalid digital certificate comprises identifying a domain name within the field;
the computer-implemented method further comprises at least one of:
- pinging the domain name to determine if it is a legitimate domain name;
- identifying a reputation score for the domain name.

7. A system for detecting malicious use of digital certificates, the system comprising:
a memory;
a deduction module, stored in the memory, that:
deduces an effectiveness of a plurality of fields within digital certificates in distinguishing malicious use of invalid certificates from benign use of invalid certificates by using a machine learning algorithm to examine fields of invalid certificates that have been used maliciously and fields of invalid certificates that have been used legitimately;
weights each of the plurality of fields according to the effectiveness of the fields;
identifies, based on the weighting of each of the plurality of fields, at least one field within invalid digital certificates that is more useful than at least one other field in distinguishing malicious use of invalid certificates from benign use of invalid certificates;
a determination module, stored in the memory, that determines, before an analysis is performed to determine whether a digital certificate is being used to facilitate malicious communications, that the digital certificate is invalid by determining that the digital certificate is not trusted by a certificate authority;
a location module, stored in the memory, that locates, within the invalid digital certificate in response to the determination that the digital certificate is invalid, the field that was identified as being more useful in distinguishing malicious use of invalid certificates from benign use of invalid certificates;
an analysis module, stored in the memory, that determines, based on an analysis of information from the field of the invalid digital certificate, that the invalid digital certificate is potentially being used to facilitate malicious communications;
a security module, stored in the memory, that performs a security action in response to determining that the invalid digital certificate is potentially being used to facilitate malicious communications;
at least one hardware processor that is configured to execute the deduction module, the determination module, the location module, the analysis module, and the security module.

8. The system of claim 7, wherein the determination module determines that the digital certificate is not trusted by the certificate authority by determining that the digital certificate is self-signed.

9. The system of claim 7, wherein the analysis module determines that the invalid digital certificate is potentially being used to facilitate malicious communications by determining that the invalid digital certificate is being used to establish an encrypted communication session for a malicious purpose.

10. The system of claim 9, wherein the security action comprises interrupting the encrypted communication session.

11. The system of claim 7, wherein the analysis module determines that the invalid digital certificate is potentially being used to facilitate malicious communications by detecting that the information within the field comprises at least one of:
- a domain name that comprises a randomly generated character string;
- a certificate chain length of 0;
- a public key length that does not conform to a key-length standard.

12. The system of claim 7, wherein:
the analysis module analyzes the information within the field of the invalid digital certificate by identifying a domain name within the field;
the analysis module further performs at least one of:
- pinging the domain name to determine if it is a legitimate domain name;
- identifying a reputation score for the domain name.

13. A non-transitory computer-readable storage medium comprising one or more computer-readable instructions that, when executed by at least one processor of a computing device, cause the computing device to:
- deduce, by a deduction module, an effectiveness of a plurality of fields within digital certificates in distinguishing malicious use of invalid certificates from benign use of invalid certificates by using a machine learning algorithm to examine fields of invalid certificates that have been used maliciously and fields of invalid certificates that have been used legitimately;
- weight, by the deduction module, each of the plurality of fields according to the effectiveness of the fields;
- identify, by the deduction module and based on the weighting of each of the plurality of fields, at least one field within invalid digital certificates that is more useful than at least one other field in distinguishing malicious use of invalid certificates from benign use of invalid certificates;
- before performing an analysis to determine whether a digital certificate is potentially being used to facilitate malicious communications, determine, by a determination module, that the digital certificate is invalid by determining that the digital certificate is not trusted by a certificate authority;
- in response to determining that the digital certificate is invalid, locate, by a location module, within the digital certificate, the field that was identified as being more useful in distinguishing malicious use of invalid certificates from benign use of invalid certificates;
- determine, by an analysis module, based on an analysis of information from the field of the invalid digital certificate, that the invalid digital certificate is potentially being used to facilitate malicious communications;
- perform, by a security module, a security action in response to determining that the invalid digital certificate is potentially being used to facilitate malicious communications.

14. The non-transitory computer-readable storage medium of claim 13, wherein the one or more computer-readable instructions cause the computing device to determine that the digital certificate is not trusted by the certificate authority by determining that the digital certificate is self-signed.

15. The non-transitory computer-readable storage medium of claim 13, wherein the one or more computer-readable instructions cause the computing device to determine that the invalid digital certificate is potentially being used to facilitate malicious communications by determining that the invalid digital certificate is being used to establish an encrypted communication session for a malicious purpose.

16. The non-transitory computer-readable storage medium of claim 15, wherein the one or more computer-readable instructions cause the computing device to, as part of the security action, interrupt the encrypted communication session.

17. The non-transitory computer-readable storage medium of claim 13, wherein the one or more computer-readable instructions cause the computing device to determine that the invalid digital certificate is potentially being used to facilitate malicious communications by detecting that the information within the field comprises at least one of:
- a domain name that comprises a randomly generated character string;
- a certificate chain length of 0;
- a public key length that does not conform to a key-length standard.

* * * * *